US012647273B1

(12) United States Patent
Carlson

(10) Patent No.: US 12,647,273 B1
(45) Date of Patent: *Jun. 2, 2026

(54) SYSTEM AND METHOD FOR BITCOIN MINING WITH REDUCED POWER

(71) Applicant: Marvell Asia Pte, Ltd., Singapore (SG)

(72) Inventor: David A Carlson, Haslet, TX (US)

(73) Assignee: Marvell Asia Pte, Ltd., Singapore (SG)

( * ) Notice: Subject to any disclaimer, the term of this patent is extended or adjusted under 35 U.S.C. 154(b) by 100 days.

This patent is subject to a terminal disclaimer.

(21) Appl. No.: 18/782,703

(22) Filed: Jul. 24, 2024

Related U.S. Application Data

(63) Continuation of application No. 18/312,101, filed on May 4, 2023, now Pat. No. 12,095,922, which is a
(Continued)

(51) Int. Cl.
        *H04L 9/32*          (2006.01)
        *G06F 21/76*         (2013.01)
        (Continued)

(52) U.S. Cl.
        CPC ............ *H04L 9/3236* (2013.01); *G06F 21/76* (2013.01); *G06Q 20/0658* (2013.01); *H04L 9/50* (2022.05); *H04L 2209/56* (2013.01)

(58) Field of Classification Search
        CPC . G06F 21/76; G06Q 20/0658; H04L 2209/56; H04L 9/0662; H04L 9/3236; H04L 9/50
        See application file for complete search history.

(56) References Cited

U.S. PATENT DOCUMENTS 6,601,175 B1 * 7/2003 Arnold .................... G06F 21/31
                                                              713/184
7,046,802 B2 * 5/2006 Rogaway .............. H04L 9/3242
                                                              380/37
(Continued)

FOREIGN PATENT DOCUMENTS

WO        2015/077378 A1     5/2015

OTHER PUBLICATIONS

"Block hashing algorithm," Retrieved from the internet at: https://en.bitcoin.it/wiki/Block_hashing_algorithm on Jun. 7, 2019, 3 pages.
(Continued)

*Primary Examiner* — Sharon S Lynch
(74) *Attorney, Agent, or Firm* — Hamilton, Brook, Smith & Reynolds, P.C.

(57)                    ABSTRACT

A circuit and corresponding method enable bitcoin mining in a blockchain network. The circuit comprises a nonce generator that generates a nonce value, on a cycle-by-cycle basis, and changes only one binary digit of the nonce value per cycle. The circuit further comprises a hash engine that inserts, on the cycle-by-cycle basis, the nonce value into a block header of a block candidate and generates a digest by applying a hash function to the block header. The block header includes a representation of a target value. The circuit further comprises a validator that compares, on the cycle-by-cycle basis, the digest to the target value. In an event the digest satisfies the target value, the validator submits the block candidate to the blockchain network, causing newly minted bitcoin to be mined from the blockchain network. Changing only one binary digit of the nonce value, per cycle, reduces the circuit's power consumption.

18 Claims, 6 Drawing Sheets

Related U.S. Application Data continuation of application No. 16/447,865, filed on Jun. 20, 2019, now Pat. No. 11,770,256.

(51) Int. Cl.
  *G06Q 20/06*  (2012.01)
  *H04L 9/00*  (2022.01)

(56) References Cited

U.S. PATENT DOCUMENTS

| | | | | |
|---|---|---|---|---|
| 7,200,227 | B2 * | 4/2007 | Rogaway | H04L 9/0637 380/37 |
| 7,949,129 | B2 * | 5/2011 | Rogaway | H04L 9/0637 380/37 |
| 8,321,675 | B2 * | 11/2012 | Rogaway | H04L 9/0637 380/37 |
| 11,296,866 | B2 * | 4/2022 | Rodriguez De Castro | G06F 9/30134 |
| 11,438,142 | B1 | 9/2022 | Carlson | |
| 11,770,256 | B1 | 9/2023 | Carlson | |
| 11,979,487 | B1 | 5/2024 | Carlson | |
| 12,095,922 | B1 | 9/2024 | Carlson | |
| 12,261,939 | B1 | 3/2025 | Carlson | |
| 2002/0051537 | A1 * | 5/2002 | Rogaway | H04L 9/3242 380/46 |
| 2002/0071552 | A1 * | 6/2002 | Rogaway | H04L 9/3242 380/37 |
| 2003/0033473 | A1 * | 2/2003 | Blodgett | G11C 11/406 711/106 |
| 2003/0088840 | A1 * | 5/2003 | Yonezawa | G06F 30/30 716/109 |
| 2006/0285684 | A1 * | 12/2006 | Rogaway | H04L 9/0637 380/37 |
| 2007/0189524 | A1 * | 8/2007 | Rogaway | H04L 9/3242 380/37 |
| 2007/0245147 | A1 * | 10/2007 | Okeya | H04L 9/0643 713/181 |
| 2010/0231420 | A1 | 9/2010 | Wei et al. | |
| 2011/0096820 | A1 | 4/2011 | Lavery et al. | |
| 2011/0191588 | A1 * | 8/2011 | Rogaway | H04L 9/3242 713/170 |
| 2013/0077780 | A1 * | 3/2013 | Rogaway | H04L 9/0637 380/42 |
| 2013/0268497 | A1 | 10/2013 | Baldwin et al. | |
| 2017/0243176 | A1 | 8/2017 | Hanke et al. | |
| 2017/0300875 | A1 | 10/2017 | Gilboa et al. | |
| 2018/0004242 | A1 | 1/2018 | Suresh et al. | |
| 2018/0006807 | A1 | 1/2018 | Suresh et al. | |
| 2018/0032741 | A1 | 2/2018 | Hogben et al. | |
| 2018/0048337 | A1 | 2/2018 | Stanley et al. | |
| 2018/0059178 | A1 | 3/2018 | Wang et al. | |
| 2018/0129476 | A1 * | 5/2018 | Wesson | G06F 7/582 |
| 2019/0164153 | A1 | 5/2019 | Agrawal et al. | |
| 2020/0228319 | A1 * | 7/2020 | Rodriguez De Castro | G06F 9/30134 |
| 2020/0412544 | A1 | 12/2020 | Kheterpal et al. | |

OTHER PUBLICATIONS

"Eremenko, Kirill, How does Bitcoin / Blockchain Mining work?," Retrieved from the internet at: https://medium.com/Swlh/how-does-bitcoin-blockchain-mining-work-36db1c5cb55d, Retrieved on Jun. 3, 2019, 10 pages (May 3, 2018).

"Everything you need to know about Bitcoin mining," Retrieved from the internet at https://www.bitcoinmining.com/, Retrieved on Feb. 25, 2019, 11 pages.

"Nonce," Retrieved from the internet at https://en.bitcoin.it/wiki/Nonce, Retrieved on Feb. 25, 2019, 1 page.

Andreas M. Antonopoulos, "Mastering Bitcoin. Unlocking Digital Crypto-Currencies.", O'Reilly Media, Apr. 2014) (Year: 2014).

Hanke, Timo, "AsicBoost—A Speedup for Bitcoin Mining," Retrieved from the internet at: https://arxiv.org/flp/arxiv/papers/1604/1604.00575.pdf, Retrieved on: Mar. 15, 2019, 10 pages (Mar. 31, 2016).

Kuo et al. "Blockchain distributed ledger technologies for biomedical and health care applications", Sep. 2017, Journal of the American Medical Informatics Association, 24(6), 2017, 1211-1220 (Year: 2017).

Nadeem, "How Bitcoin mining really works", May 2018, https://www.freecodecamp.org/news/how-bitcoin-mining-really-works-38563ec38c87/ (Year: 2018).

Secure Hash Standard (SHS), Federal Information Processing Standards Publication 180-4, Information Technology Laboratory, National Institute of Standards and Technology, Gaithersburg, MD 20899-8900, 36 pages (Aug. 2015).

U.S. Appl. No. 16/447,865, entitled "System and Method for Bitcoin Mining with Reduced Power," filed Jun. 20, 2019.

U.S. Appl. No. 16/544,203, entitled "System and Method for Mining Digital Currency in a Blockchain Network," filed Aug. 19, 2019.

U.S. Appl. No. 18/622,026, entitled "System and Method for Mining Digital Currency in a Blockchain Network," filed Mar. 29, 2024.

U.S. Appl. No. 19/064,287, entitled "System and Method for Mining Digital Currency in a Blockchain Network," filed Feb. 26, 2025.

* cited by examiner

328

BLOCK HEADER 348

| | |
|---|---|
| PROTOCOL VERSION | 362 |
| PREVIOUS BLOCK HASH | 364 |
| MERKLE ROOT | 366 |
| TIMESTAMP | 368 |
| REPRESENTATION OF A TARGET VALUE | 356 |
| NONCE VALUE | 344 |
| TRANSACTION COUNT | 374 |
| COINBASE TRANSACTION | 376 |
| TRANSACTION | 378 |
| OTHER TRANSACTIONS · · · | 380 |

| CYCLE 405 | BINARY CODE 403 b[3:0] | | | | NUMBER OF BITS CHANGED 407 | GRAY CODE 444 g[3:0] | | | | NUMBER OF BITS CHANGED 409 |
|---|---|---|---|---|---|---|---|---|---|---|
| 0 | 0 | 0 | 0 | 0 | 4 | 0 | 0 | 0 | 0 | 1 |
| 1 | 0 | 0 | 0 | 1 | 1 | 0 | 0 | 0 | 1 | 1 |
| 2 | 0 | 0 | 1 | 0 | 2 | 0 | 0 | 1 | 1 | 1 |
| 3 | 0 | 0 | 1 | 1 | 1 | 0 | 0 | 1 | 0 | 1 |
| 4 | 0 | 1 | 0 | 0 | 3 | 0 | 1 | 1 | 0 | 1 |
| 5 | 0 | 1 | 0 | 1 | 1 | 0 | 1 | 1 | 1 | 1 |
| 6 | 0 | 1 | 1 | 0 | 2 | 0 | 1 | 0 | 1 | 1 |
| 7 | 0 | 1 | 1 | 1 | 1 | 0 | 1 | 0 | 0 | 1 |
| 8 | 1 | 0 | 0 | 0 | 4 | 1 | 1 | 0 | 0 | 1 |
| 9 | 1 | 0 | 0 | 1 | 1 | 1 | 1 | 0 | 1 | 1 |
| 10 | 1 | 0 | 1 | 0 | 2 | 1 | 1 | 1 | 1 | 1 |
| 11 | 1 | 0 | 1 | 1 | 1 | 1 | 1 | 1 | 0 | 1 |
| 12 | 1 | 1 | 0 | 0 | 3 | 1 | 0 | 1 | 0 | 1 |
| 13 | 1 | 1 | 0 | 1 | 1 | 1 | 0 | 1 | 1 | 1 |
| 14 | 1 | 1 | 1 | 0 | 2 | 1 | 0 | 0 | 1 | 1 |
| 15 | 1 | 1 | 1 | 1 | 1 | 1 | 0 | 0 | 0 | 1 |

WRAP 401

SYSTEM AND METHOD FOR BITCOIN MINING WITH REDUCED POWER

RELATED APPLICATION

This application is a continuation of U.S. application Ser. No. 18/312,101, filed May 4, 2023, now U.S. Pat. No. 12,095,922, issued on Sep. 17, 2024, which is a continuation of U.S. application Ser. No. 16/447,865, filed Jun. 20, 2019, now U.S. Pat. No. 11,770,256, issued on Sep. 26, 2023. The entire teachings of the above applications are incorporated herein by reference.

BACKGROUND

Bitcoin is a cryptocurrency, a form of electronic cash. It is a decentralized digital currency without a central bank or single administrator. Bitcoin mining is the process of updating a ledger, that is, a distributed ledger of bitcoin transactions known as a blockchain. The process of bitcoin mining is designed to allow a decentralized network to come to a consensus in which all nodes in the decentralized network agree to the same blockchain.

In general, the decentralized network can store and reference common information in the blockchain. Each block on the blockchain includes units of information, that is, transactions. Using a predefined protocol, the blocks are linked by having their hash values inserted into a designated field in the next sequential block in the blockchain.

Bitcoin mining is performed by powerful computers in a system, that is, the decentralized network, that race against other miners, that is, mining computers, in an attempt to compute a proof-of-work for a block, that is, a next block to be added to the blockchain. Such a next block may also be referred to interchangeably herein as a block candidate. The proof-of-work function includes finding a nonce value that, when inserted into a designated field of a block header of the block, results in a cryptographic hash value of the block header that is less than a difficulty target, also referred to interchangeably herein as a target or target value. The block header stores a packed representation for its actual hexadecimal target. The target can be derived from the packed representation via a predefined formula.

Since it is believed infeasible to predict which combination of bits for the hash will result in the right hash, many different nonce values are tried, and the cryptographic hash value is recomputed for each nonce value until a cryptographic hash value that is less than or equal to a current target value of the network is found. The current target value represents the difficulty for determining the combination of bits, where a higher difficulty represents a lower target. As this iterative calculation requires time and resources, the presentation of the block with the correct nonce value constitutes proof-of-work.

The rules for mining are crafted in a way that the more mining power the system has, the harder it is to compute the proof-of-work. If more miners join, it will get harder to solve the problem; if many of them drop off, it will get easier. As such, a difficulty of the mining process is self-adjusting to an accumulated mining power that the system possesses. The chances of a particular miner successfully solving a block, that is, the chances of computing the proof-of-work for the block, are, at any particular point in time, proportional to the miner's hash rate relative to a hash rate of the whole system. Once a miner computes the proof-of-work for the block, the miner submits that block to the whole network so that the proof-of-work can be validated. While finding the proof-of-work is very hard to achieve, it is very easy to validate.

According to the Bitcoin protocol, a first miner to successfully compute the proof-of-work for the block is entitled to add the block to the blockchain and receive newly minted bitcoins as a reward. As such, the bitcoin mining process "mines" new bitcoins from the system. The main goal of mining is, however, to maintain the ledger in a decentralized manner. Each computer that validates the first miner's "solution," that is, the first miner's proof-of-work, updates its copy of the ledger with the transactions that the first miner included in the block. All the transactions in the block added by the first miner are now confirmed by the system and are virtually irreversible. In addition to receiving the newly minted bitcoins, the first miner to successfully compute the proof-of-work for the block is also paid any transaction fees that were attached to the transactions that were inserted into the block.

SUMMARY

According to an example embodiment, a circuit for bitcoin mining in a blockchain network comprises a nonce generator configured to generate a nonce value, on a cycle-by-cycle basis, and to change only one binary digit of the nonce value per cycle. The circuit further comprises a hash engine configured to insert, on the cycle-by-cycle basis, the nonce value into a block header of a block candidate and generate a digest by applying a hash function to the block header. The block header includes a representation of a target value. The circuit further comprises a validator configured to compare, on the cycle-by-cycle basis, the digest to the target value and, in an event the digest satisfies the target value, the validator is further configured to submit the block candidate with the nonce value to the blockchain network, causing bitcoin to be mined from the blockchain network.

The nonce generator may be a gray code counter. According to one embodiment, the nonce value may be a 32-bit gray code value output from the gray code counter. It should be understood, however, that the nonce value may be any number of bits and is not limited to 32 bits.

Generating the nonce value via the gray code counter reduces power consumption of the circuit relative to using a binary counter to generate the nonce value.

To apply the hash function to the block header, the hash engine may be further configured to compute a first hash value by hashing the block header via the hash function and compute a second hash value by hashing the first hash value via the hash function, wherein the digest is the second hash value.

According to one embodiment, a length of the digest may be 256 bits. It should be understood that the length of the digest may be any number of bits and is not limited to 256 bits.

The validator may be further configured to convert the representation to the target value. In an event the digest is less than or equal to the target value, the validator is further configured to conclude that the digest satisfies the target value based on comparing the digest to the target value.

The circuit may further comprise a reset controller that may be configured to reset the nonce generator in the event the validator concludes that the digest satisfies the target value.

The circuit may further comprise a block generator that may be configured to generate the block candidate for input to the hash engine. In the event the validator concludes that the digest satisfies the target value, the block generator may be further configured to change the block candidate generated to a different block candidate for use by the hash engine.

The circuit may be an application-specific integrated circuit (ASIC).

According to another example embodiment, a method for bitcoin mining in a blockchain network may comprise generating a nonce value, on a cycle-by-cycle basis, changing only one binary digit of the nonce value per cycle. The method may further comprise inserting, on the cycle-by-cycle basis, the nonce value into a block header of a block candidate and generating a digest by applying a hash function to the block header. The block header includes a representation of a target value. The method may further comprise comparing, on the cycle-by-cycle basis, the digest to the target value and, in an event the digest satisfies the target value, submitting the block candidate to the blockchain network, causing bitcoin to be mined from the blockchain network.

Alternative method embodiments parallel those described above in connection with the example circuit embodiment.

According to yet another example embodiment, an application-specific integrated circuit (ASIC) for bitcoin mining in a blockchain network comprises a gray code counter configured to output a gray code. The ASIC further comprises a hash engine configured to insert the gray code into a nonce field of a block header of a block candidate and generate a digest by applying a hash function to the block header. The block header includes a representation of a target value. The ASIC further comprises a validator configured to compare the digest to the target value and, in an event the digest generated satisfies the target value, the validator is further configured to submit the block candidate with the gray code to the blockchain network, causing bitcoin to be mined from the blockchain network.

Alternative ASIC embodiments parallel those described above in connection with the example circuit embodiment.

It should be understood that example embodiments disclosed herein can be implemented in the form of a method, apparatus, or system.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
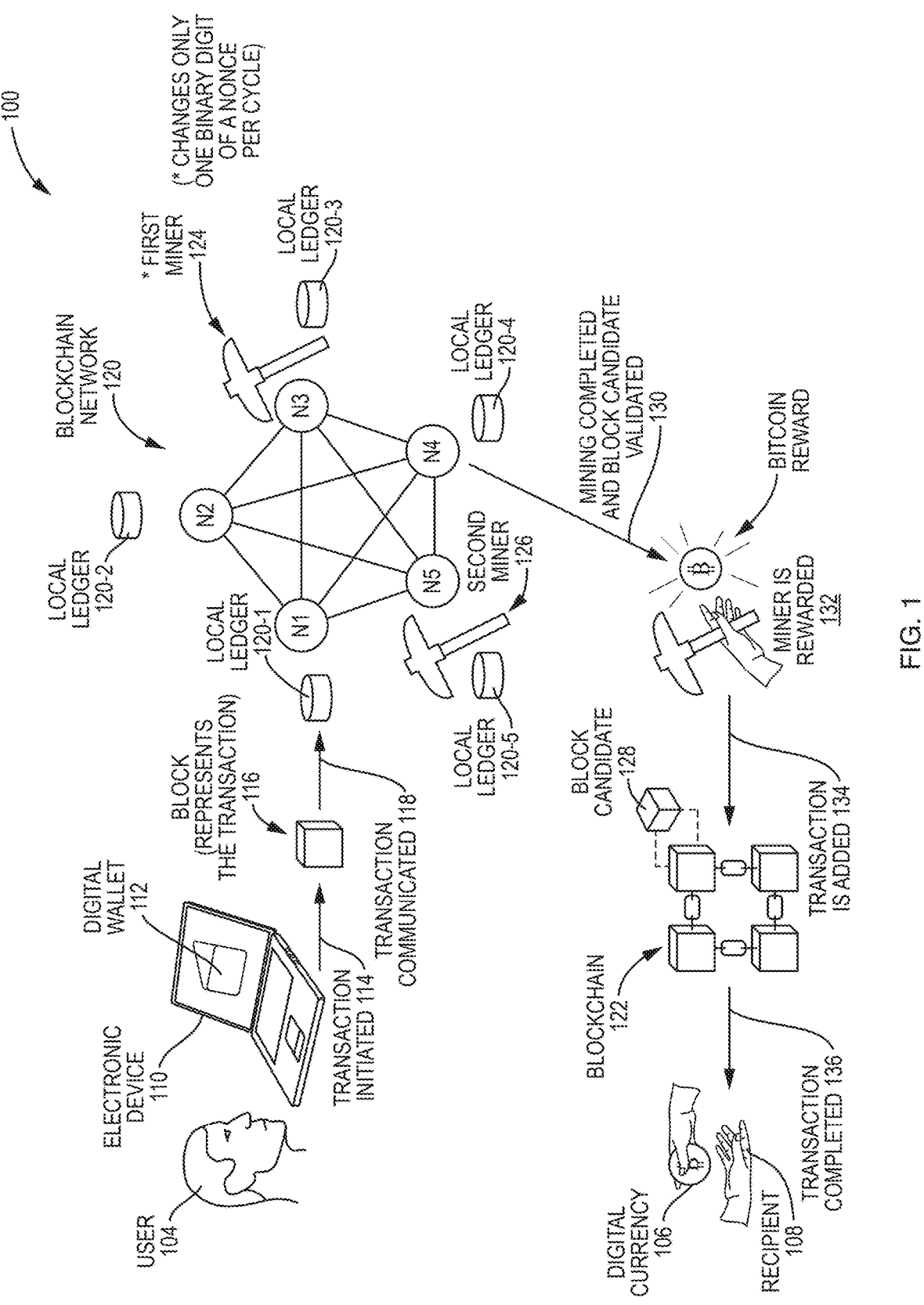
FIG. 1 is a block diagram of an example embodiment of a system that includes a blockchain network.

A description of example embodiments follows.

It should be understood that the term "blockchain" as used herein includes all forms of electronic, computer-based, distributed ledgers. These include consensus-based blockchain and transaction-chain technologies, permissioned and un-permissioned ledgers, shared ledgers and variations thereof. While Bitcoin may be referred to herein for the purpose of convenience and illustration, it should be noted that the disclosure is not limited to use with the Bitcoin blockchain and alternative blockchain implementations and protocols fall within the scope of the present disclosure. Further, it should be understood that the present disclosure is not limited to bitcoin mining and that mining for other forms of digital currency fall within the scope of the present disclosure.

Each miner in a bitcoin blockchain consumes an amount of energy in its attempt to solve a proof-of-work function. As such, while the successful miner that solves the proof-of-work function may receive newly minted bitcoin and transaction fees, power consumption of the miner affects profitability. The proof-of-work function is to find a nonce to insert in a block header, such that the double hash of the block header results in a digest (i.e., cryptographic hash) with a large number of zero's. The block header has a 32-bit nonce field, such as disclosed further below with regard to FIG. 3. It should be understood, however, that present disclosure is not limited to a bitcoin blockchain and that the nonce field is not limited to 32-bits.

According to an example embodiment, power consumption for solving the proof-of-work function may be reduced relative to conventional miners that compute a double hash of the block header on the entire 2^32 nonce space, looking for the "magic" result, that is, a digest that is less than or equal to a target value. According to an example embodiment, the nonce value may be generated using a gray code counter instead of a binary counter. Such an implementation cuts the number of input bits to be changed for the nonce value in half, per cycle, saving a percent or two in power, increasing profitability.

Bitcoin's difficulty target, that is, the target value, is a 256-bit number that is adjusted every 2016 blocks (~2 weeks) based on the time it took to mine the previous 2016 blocks. The difficulty method attempts to produce a block roughly every ten minutes and is proportionately modified by miners every two weeks to the amount of time higher or lower than it took to mine the previous 2016 blocks. A higher difficulty target means blocks are easier to produce and a lower difficulty target means that they are harder to mine.

Proof-of-work is designed so that miners expend resources (hardware and electricity) to secure the network, which concurrently creates an incentive for miners to secure the network because their reward for mining is received directly in bitcoins and they have invested electricity and hardware into acquiring bitcoins. The difficulty adjustment plays the role of regulating the issuance of bitcoins into the ecosystem at a fixed and predetermined rate. When the Bitcoin price rises, more miners are incentivized to join the network to take advantage of the profit margins, leading to an increase in the network's hash power. If there were no difficulty adjustment to make it harder to mine blocks at an increased hash power, then bitcoins would be issued at a continually faster pace than the predetermined ten minutes, making Bitcoin susceptible to a rising stock-to-flow ratio that plagues inflationary fiat currencies and even scarce minerals like silver.

For instance, when the value of silver rises, mining companies are incentivized to mine more silver, increasing the supply of silver and deflating the price. No matter how much hash power the Bitcoin network aggregates, this problem will never occur because the difficulty target adjusts to make the issuance rate consistent despite more miners contributing computing power to solve proof-of-work.

A node is a powerful computer that runs the bitcoin software and helps to keep bitcoin running by participating in the relay of information. Anyone can run a node by downloading the bitcoin software (free) and leave a certain port open. The drawback is that mining consumes power and storage space. An example embodiment disclosed herein reduces an amount of power consumption used for solving the proof-of-work function.

Mining nodes, also referred to interchangeably herein as miners, group outstanding transactions into a block and add the block to a blockchain, such as the blockchain 122 of FIG. 1, disclosed below. Miners are able to add the block by solving a complex mathematical puzzle, that is, the proof-of-work function, that is part of the bitcoin program, and including the answer in the block. The puzzle that needs to be solved by the miner is to find a number that, when combined with the data in the block header and passed through a hash function, produces a result that is within a certain range. The number is called a "nonce," which is a concatenation of "number used once." In the case of Bitcoin, the nonce is an integer between 0 and 4,294,967,296.

The hash function makes it impossible to predict what the output will be. Miners guess the mystery number for the nonce value and apply the hash function to the combination of that nonce value and other data in the block header. The resulting hash has to start with a pre-established number of zeroes. The predetermined number of zeros is reflected in the target value. There's no way of knowing which number for the nonce value will work, because two consecutive integers will give wildly varying results for the resulting hash.

The first miner to get a resulting hash within the desired range announces its victory to the rest of the network. All the other miners immediately stop work on that block and start trying to figure out the mystery number for a next block candidate. As a reward for its work, the victorious miner receives newly minted bitcoin. The costs of being a mining node are, however, considerable, not only because of the powerful hardware needed (with a faster processor than that of competitors, there is a better chance of finding the correct number before the competitors do), but also because of the large amounts of electricity that running these processors consumes.

A number of bitcoins awarded as a reward for solving the puzzle will decrease, for example, by halving every four years or so. The difficulty of the calculation (the required number of zeroes at the beginning of the target hash value) is adjusted frequently, so that it may take on average about ten minutes to process a block. Ten minutes is the amount of time thought to be necessary for a steady and diminishing flow of new coins until the maximum number of 21 million is reached, expected at some time in the year 2140.

Over the long-term, the issuance of bitcoins will never change even if the price rises to an astronomical sum. Since the increase in hash power cannot lead to more bitcoins being issued than what is predetermined, the collateral effect is that the security of the network increases by more miners joining the network. In the early days of bitcoin, when the difficulty requirement was lower due to less miners, the miners would group a number of transactions, take the Merkle root, use the current time as the timestamp, create the block header, then iterate through the nonce space—and they stood a decent chance of finding a nonce that, when combined with the rest of the info in the block header, produced a Secure Hash Algorithm ("SHA") hash that satisfied the difficulty requirement.

With the number of miners increasing, the difficulty requirement has increased. Miners may need to iterate through a range of nonce values and then try again, by changing something else in the block header (e.g., the timestamp), then iterate through the range of nonce values again in hopes of finding a nonce value that satisfies the difficulty requirement. This process repeats many times, until finally a miner finds the winning combination of header information and nonce value that produces a hash that satisfies the difficulty requirement. An example embodiment improves power consumption for such a process, by changing the nonce value by only one binary digit, per cycle.

FIG. 1 is a block diagram of an example embodiment of a system 100 that includes a blockchain network 102. The blockchain network 102 is a peer-to-peer network that includes a plurality of nodes, namely, node N1, node N2, Node N3, node N4, and node N5. It should be understood that a total number of nodes in the blockchain network 102 may be any total number of nodes and is not limited to five nodes. Further, such nodes may include any type of computing device(s) and may include a computer farm(s).

A blockchain 122 is distributed across the blockchain network 102. The blockchain 122 is a growing list of records, called blocks, which are linked using cryptography. Each block contains a cryptographic hash of the previous block, a timestamp, and transaction data, generally represented as a Merkle tree. By design, the blockchain 122 is resistant to modification. The blockchain 122 is a distributed ledger, each of the nodes N1, N2, N3, N4, and N5 has a local ledger, namely, the local ledger 120-1, local ledger 120-2, local ledger 120-3, local ledger 120-4, and local ledger 120-5, respectively, that is a respective copy of the distributed ledger.

The blockchain network 102 has no central authority. The blockchain 122 is a shared and immutable ledger, the information stored on it is open for anyone and everyone to see. The blockchain 122 enables, for example, the digital currency 106 to be transferred from the user 104 to the recipient 108 in a fully automated and safe manner. The user 104 initiates the transaction process by creating a block 116. The block 166 is verified by the plurality of nodes N1, N2, N3, N4, and N5 in the blockchain network 102 before it can be added to the blockchain 122, enabling the transaction to complete.

For example, in the system 100, the user 104 initiates a transaction (not shown) to send the digital currency 106 to the recipient 108. The user 104 initiates the transaction via an electronic device 110 that may be a laptop computer, desktop computer, smartphone, or any other electronic computing device. In the example embodiment, the digital currency 106 is bitcoin and the transaction is a wire transfer. To initiate the wire transfer, the user 104 uses a digital wallet 112, that is, an application (i.e., app) installed on the electronic device 110. The digital wallet 112 creates the transaction that may include information regarding the user 104, an amount of the digital currency 106 to be transferred, and information associated with the recipient 108. The transaction is initiated 114 and communicated 118 to the blockchain network 102. For example, the transaction is represented as the block 116 that is broadcast to the nodes N1-N5.

In the example embodiment, node N3 is a first miner 124 and node N5 is a second miner 126. The miners, that is, the first miner 124 and the second miner 126 race to compute a proof-of-work for a block candidate 128 that includes the transaction represented by the block 116. According to the Bitcoin protocol, the miner that successfully computes a valid proof-of-work for the block candidate 128 is entitled to add the block candidate 128 to the blockchain 122 causing new units of bitcoin to be generated as a reward. In addition, the successful miner may get paid any transaction fees that were attached to transactions that the successful miner had inserted into the block candidate 128.

The proof-of-work for the block candidate 128 is a nonce value that, when inserted in a designated field in a block header (not shown) of the block candidate 128, causes a cryptographic hash value of the block candidate 128 to meet a certain difficulty target. Once mining is completed, the block candidate 128 and proof-of-work (not shown), are sent to the whole blockchain network 102 so other nodes can validate it. After mining is completed and the block candidate validated 130, the miner that submitted the block candidate 128 with the valid proof-of-work is the miner that is rewarded. Each node in the blockchain network updates its local ledger with the transactions that the miner chose to include in the block candidate 128. All the transactions in the block candidate 122 are now confirmed by the blockchain network 102 and are virtually irreversible. The miner is rewarded 132 and the block candidate 128 is added to the blockchain 128 and, as such, the transaction is added 134 to the blockchain 122. The transaction is completed 136 and the recipient 108 receives the digital currency 106.

The power consumption of the successful miner affects profitability. No better approach than trial-and-error has yet been discovered for finding the valid nonce that provides the proof-of-work. According to an example embodiment, the first miner 124 employs at least one circuit for bitcoin mining in the blockchain network 102 that changes only one binary digit of a nonce value per cycle. Changing only one binary digit of the nonce value, per cycle, reduces power consumption of the circuit relative to, for example, changing the nonce value linearly via a binary counter.

The first miner 124 may be a mining farm with, for example, a plurality of mining application-specific integrated circuits (ASICs) each employing the at least one circuit, such as the circuit 240 of FIG. 2, disclosed below, to reduce power consumption of the mining farm. It should be understood that the first miner 124 is not limited to a mining farm and may be a single computing device.

Figure 2:
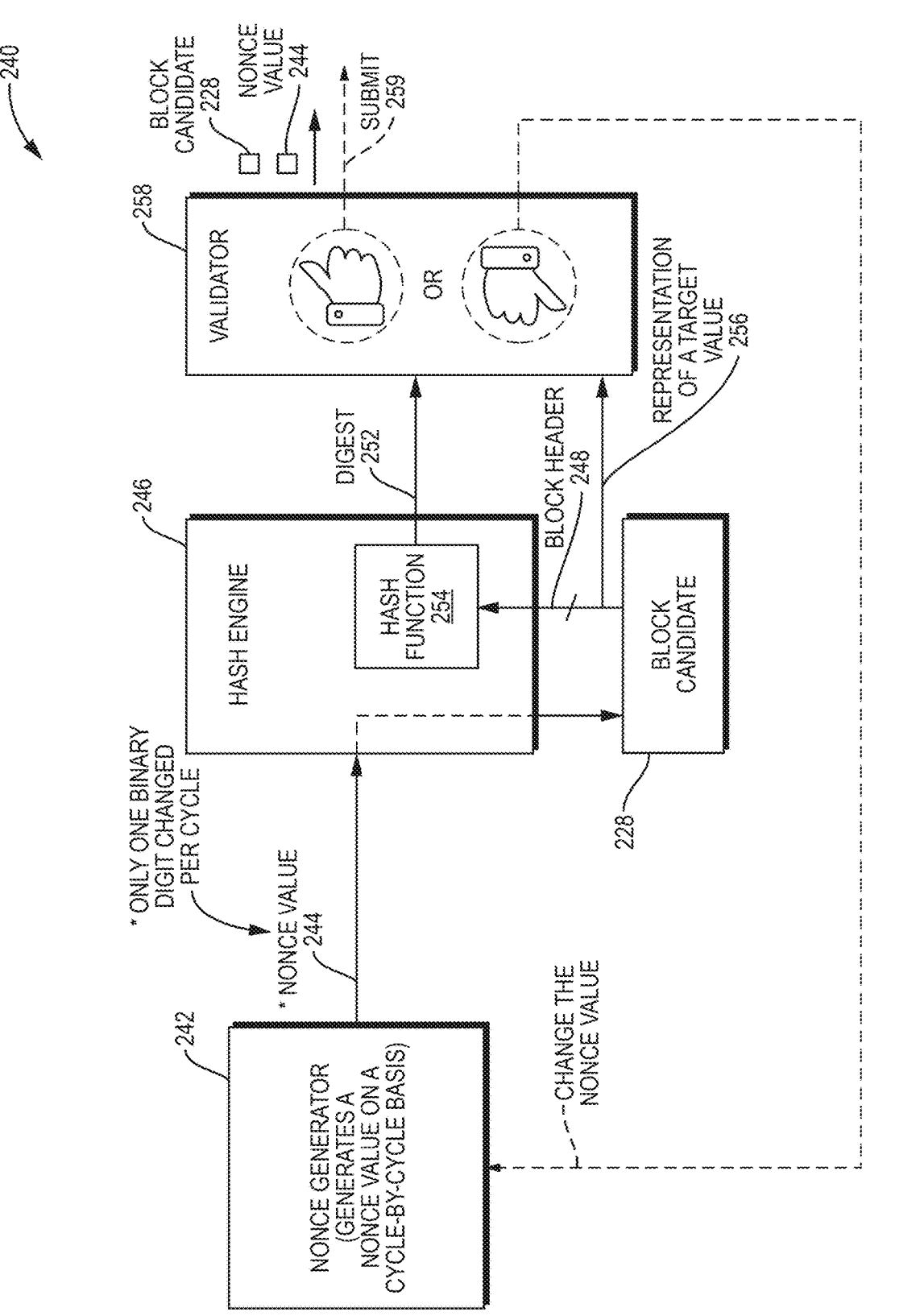
FIG. 2 is a block diagram of an example embodiment of a circuit for bitcoin mining in a blockchain network.

FIG. 2 is a block diagram of a circuit 240 for bitcoin mining in a blockchain network, such as the blockchain network 102 of FIG. 1, disclosed above. The circuit 240 comprises a nonce generator 242 configured to generate a nonce value 244, on a cycle-by-cycle basis, and to change only one binary digit of the nonce value 244 per cycle. The circuit 240 further comprises a hash engine 246 configured to insert, on the cycle-by-cycle basis, the nonce value 244 into a block header 248 of a block candidate 228 and to generate a digest 252, that is, a cryptographic hash, by applying a hash function 254 to the block header 248. The block header 248 includes a representation of a target value 256, such as disclosed below with regard to FIG. 3.

Figure 3:
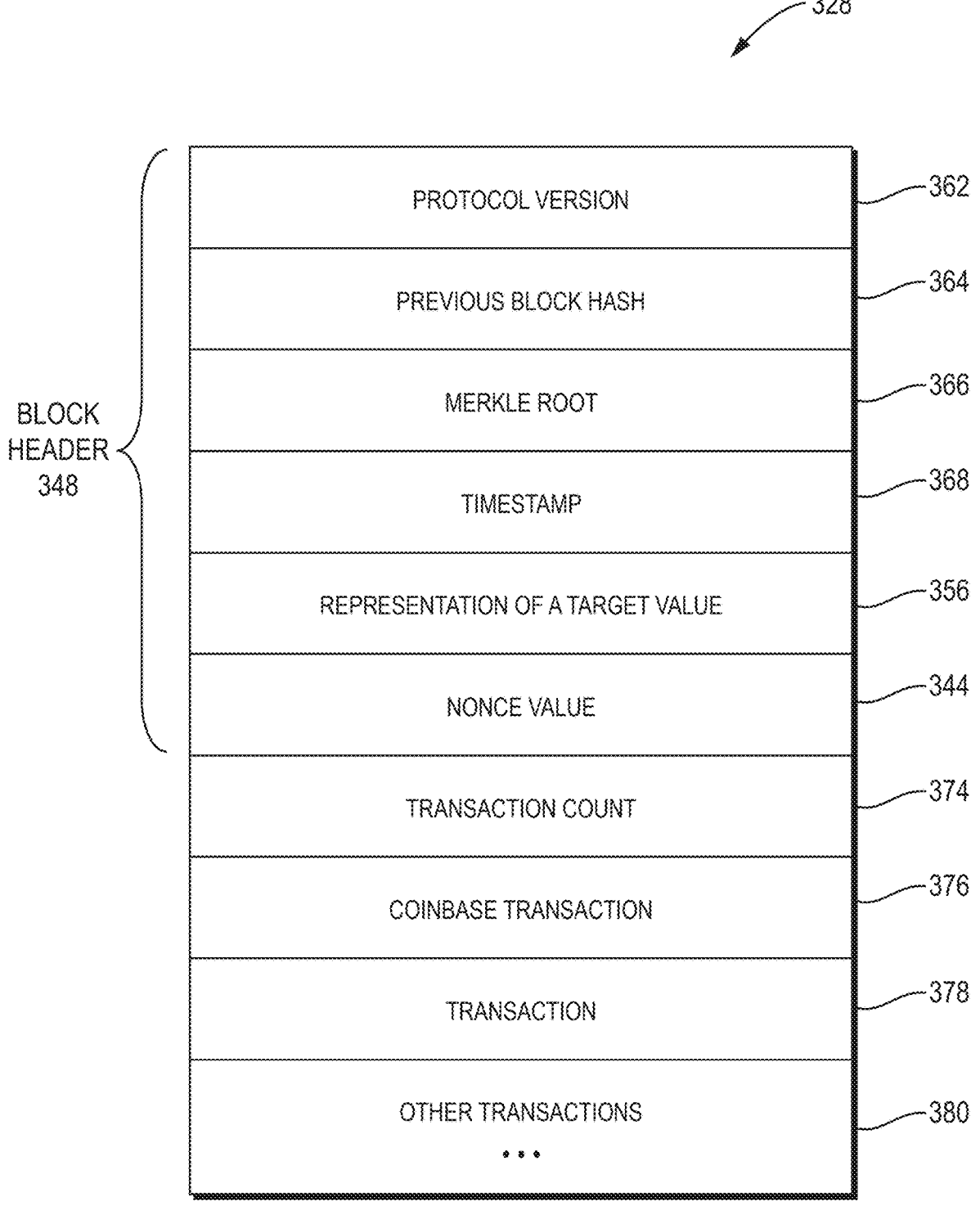
FIG. 3 is an example embodiment of a prior art format of block header of a block.

FIG. 3 is an example embodiment of a prior art format of block header 348 of a block 328. The prior art format is for a bitcoin block header. The block 328 includes the block header 348 that is followed by the transactions that go into the block 328. The block 328 includes a transaction count 374 of the transactions. The first transaction of the transactions is a coinbase transaction 376 that grants the mining reward to the miner, such as either the first miner 124 or the second miner 126 of FIG. 1, disclosed above, that successfully provides the proof-of-work. The remaining transactions are standard Bitcoin transactions that include, for example, the transaction 378 and any other transaction 380. The transaction 378 may be, for example, the transaction that is initiated by the user 104, as disclosed above with regard to FIG. 1.

The block 328 may be employed as the block candidate 128 or the block candidate 228 of FIG. 1 and FIG. 2, respectively, as disclosed above. The bitcoin block header 348 includes a handful of fields that describe the block 328. It should be understood that the block header 348 is not limited to those handful of fields. A first field in the block header 348 is for the protocol version 362 and is followed by a field for the hash of the previous block in the blockchain, that is, the previous block hash 364. The previous block hash 364 ensures that all the blocks form an unbroken sequence in the blockchain and is followed by a field for the Merkle root 366. The Merkle root 366 is a special hash of all the transactions in the block 328 and ensures that transactions that are part of the block 328 cannot be changed. Next is a field for a timestamp 368 of the block 328, followed by a representation of a target value 356 that may be employed as the representation of the target value 256 of FIG. 2, disclosed above.

The representation of the target value 356 is a set of bits that represent the mining difficulty value, also referred to interchangeably herein as the target or target value. The representation of the target value 356 may be a compact format of the target based on a floating-point encoding using, for example, 3 bytes mantissa, the leading byte as an exponent (where only the 5 lowest bits are used), and its base may be 256. It should be understood, however, that the representation is not limited to the floating-point encoding. As such, the representation of the target value 356 may be converted to derive the actual target value, that is, a hash value that is the mining difficulty value. Following the field for the representation of the target value 356 is a field for the nonce value 344. The nonce value 344 is an arbitrary value that is changed on each hash attempt of the block header 348 to provide a hash value that is less than or equal to the actual target value. If the hash value starts with enough zeros, the block is successfully mined, that is, a valid proof-of-work has been found and may be submitted to peers in the blockchain network for validation. According to an example embodiment, the nonce value 344 may be changed on a per-cycle-basis in a manner that reduces power consumption.

Referring back to FIG. 2, the circuit 240 further comprises a validator 258 configured to compare, on the cycle-by-cycle basis, the digest 252 to the target value and, in an event the digest 252 satisfies the target value, the validator 258 is further configured to submit 259 the block candidate 228 with the nonce value 244 to the blockchain network, such as the blockchain network 102 of FIG. 1, disclosed above, causing bitcoin to be mined from the blockchain network. Such submission provides the proof-of-work to the blockchain network and causes the nodes in the blockchain network to validate same. Such validation by the nodes in the blockchain network enables the block candidate 228 to be added to the blockchain, such as the blockchain 122 of FIG. 1, disclosed above.

As a result, bitcoin(s) are mined from the blockchain network, that is, newly minted bitcoin(s) are generated and provided to the successful miner as a reward. By employing the nonce generator 242 that is configured to generate a nonce value 244, on a cycle-by-cycle basis, and to change only one binary digit of the nonce value 244 per cycle, the circuit 240 enables the successful miner to compute the proof-of-work with reduced power consumption relative to computing the proof-of-work with nonce values generated by a binary counter. The binary counter changes more than one binary digit per cycle and, thus, uses more energy due to the larger number of transitions, per cycle.

According to one embodiment, the nonce generator 242 may be a gray code counter (not shown). For example, the nonce value 244 may be a 32-bit gray code value (not shown) that is output from the gray code counter. It should be understood, however, that the nonce value 244 and the gray code value are not limited to 32-bits. Generating the nonce value 244 via the gray code counter reduces power consumption of the circuit 240 relative to using a binary counter to generate the nonce value 244 because the gray code counter changes only one binary digit of the nonce value per cycle, such as disclosed below with regard to FIG. 4.

Figure 4:
FIG. 4 is a table of an example embodiment of binary and gray code values for 4-bit count sequences.

FIG. 4 is a table 400 of an example embodiment of binary and gray code values for 4-bit count sequences. The 4-bit count sequences wrap 401 in the table 400. For example, a first cycle (i.e., cycle 0), with an initial count value, follows a last cycle (i.e., cycle 15) in the 4-bit count sequence. The table 400 includes a binary code 403 and a gray code 444 for each cycle 405 of the 4-bit count. The binary code 403 has a value of 0000b for cycle 0 and a value of 1111b for cycle 15, whereas the gray code 444 has a value of 0000b for cycle 0 and a value of 1000b for cycle 15.

In the table 400, the number of bits changed 407 indicates a total number of bits that were changed in the binary code 403 relative to a previous cycle. Similarly, the number of bits changed 409 indicates a total number of bits that were changed in the gray code 444 relative to the previous cycle. As disclosed in the table 400, the number of bits changed 409 of the gray code 444 is only one bit per cycle, whereas the number of bits changed 407 for the binary code 403 varies from one bit to four bits changed per cycle. As such, an average number of bits changing per cycle is cut in half by using the gray code 444 relative to using the binary code 403. Such a reduction of bits changing per cycle saves a percent or two in power consumption because there are less transitions occurring in the circuit. It should be understood that the 4-bit count sequences shown in Table 4 are for illustrative purpose and that the reduction in the number of bits changed 409 in the gray code 444 versus the number of bits changed 407 in the binary code 403 extends to larger bit count sequences, such as a 32-bit count sequence that may be employed for the nonce value 244 of FIG. 2, disclosed above. For simplicity, the 32-bit count sequence comparison between a binary and gray code counter is not shown. It should be understood that the gray code 444 and nonce value 244 are not limited to 32-bit counter sequences.

Referring back to FIG. 2, to apply the hash function 254 to the block header 248, the hash engine 246 may be further configured to compute a first hash value (not shown) by hashing the block header 248 via the hash function 254 and compute a second hash value (not shown) by hashing the first hash value via the hash function 254, wherein the digest 252 is the second hash value. A length of the digest may be 256 bits. For example, the first hash value may be computed by applying the SHA-256 hash method to the block header 248 and the second hash value may be computed by applying the SHA-246 hash method to the first hash value. As such, the second hash value, that is, the digest, may be a fixed-size 256-bit (32-byte) hash that is computed as SHA256(SHA256(block header 248)). It should be understood, however, that the digest is not limited to 256 bits and that the hash function is not limited to the SHA256 hash function.

The validator 258 may be further configured to convert the representation to the target value 256, such as disclosed above with regard to FIG. 3. In an event the digest 252 is less than or equal to the target value, the validator 258 is further configured to conclude that the digest 252 satisfies the target value based on comparing the digest 252 to the target value.

The circuit 240 may further comprise a reset controller (not shown) that may be configured to reset the nonce generator 242 in the event the validator 258 concludes that the digest 252 satisfies the target value. Such a reset may also be employed based on a determination that another miner has provided the proof-of-work for the block candidate 228.

The circuit 240 may further comprise a block generator (not shown) that may be configured to generate the block candidate 228 for input to the hash engine 246. In the event the validator 258 concludes that the digest 252 satisfies the target value, the block generator may be further configured to change the block candidate 228 to a different block candidate for use by the hash engine 246. The reset controller may reset the nonce generator 242 to start the nonce value 244 at an initial value and the circuit 240 may begin to attempt to solve the proof-of-work for the different block candidate by again generating the nonce value 244 on a cycle-by-cycle basis, changing only one bit of the nonce value per cycle.

According to an example embodiment, the circuit 240 may be an application-specific integrated circuit (ASIC), such as the ASIC 540 disclosed below with reference to FIG. 5.

Figure 5:
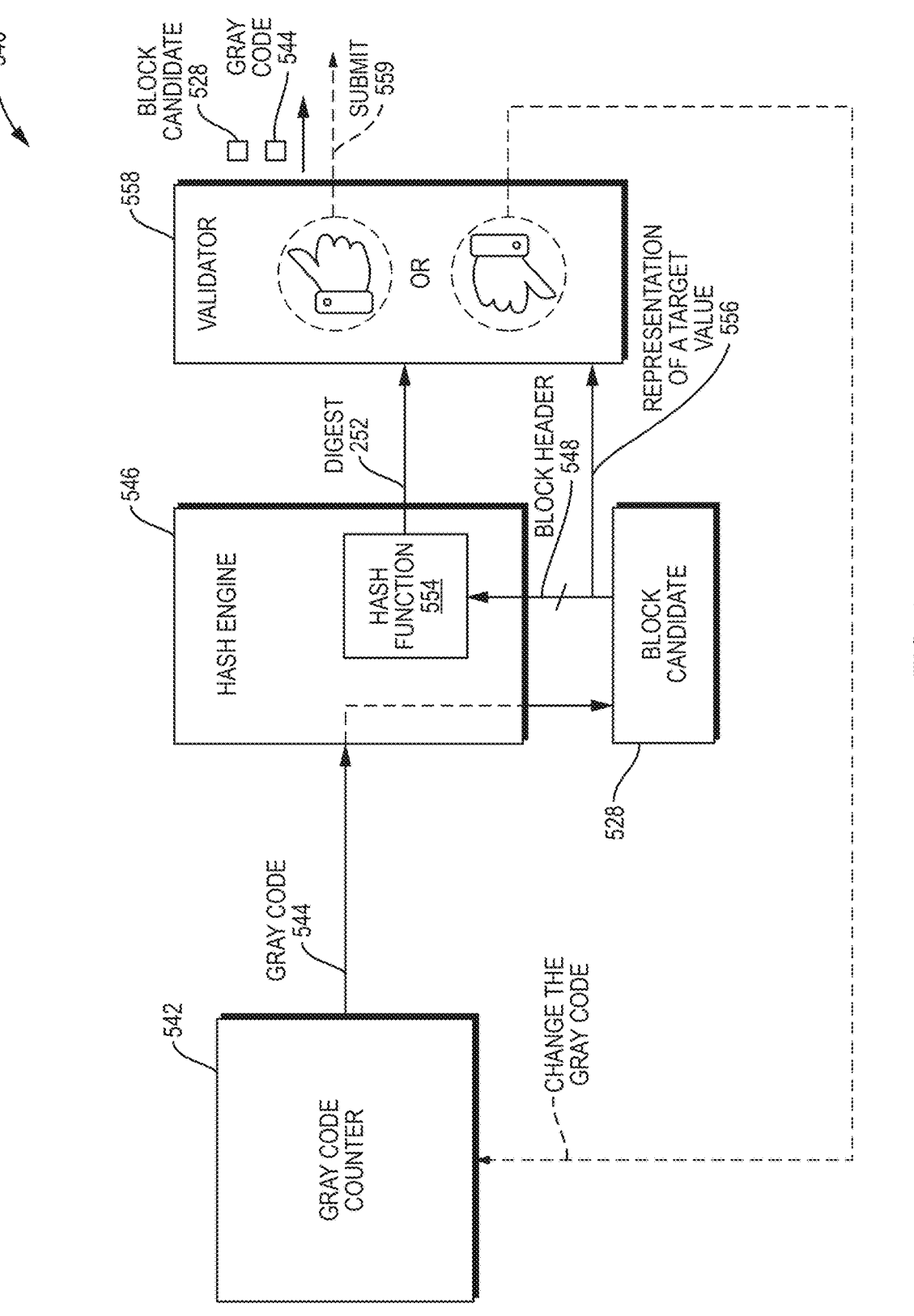
FIG. 5 is a block diagram of an example embodiment of an application-specific integrated circuit (ASIC) for bitcoin mining in a blockchain network.

FIG. 5 is a block diagram of an ASIC 540 for bitcoin mining in a blockchain network, such as the blockchain network 100 of FIG. 1, disclosed above. The ASIC 540 comprises a gray code counter 542 configured to output a gray code 544. The ASIC 540 further comprises a hash engine 546 configured to insert the gray code 544 into a nonce field (not shown) of a block header 548 of a block candidate 528 and generate a digest 552 by applying a hash function 554 to the block header 548. The block header 528 includes a representation of a target value 556. The ASIC 540 further comprises a validator 558 configured to compare the digest 552 to the target value (not shown). In an event the digest 552 satisfies the target value, the validator 558 is further configured to submit 559 the block candidate 528 with the gray code 544 to the blockchain network, such as the blockchain network 102 of FIG. 1, disclosed above, causing bitcoin to be mined from the blockchain network.

Figure 6:
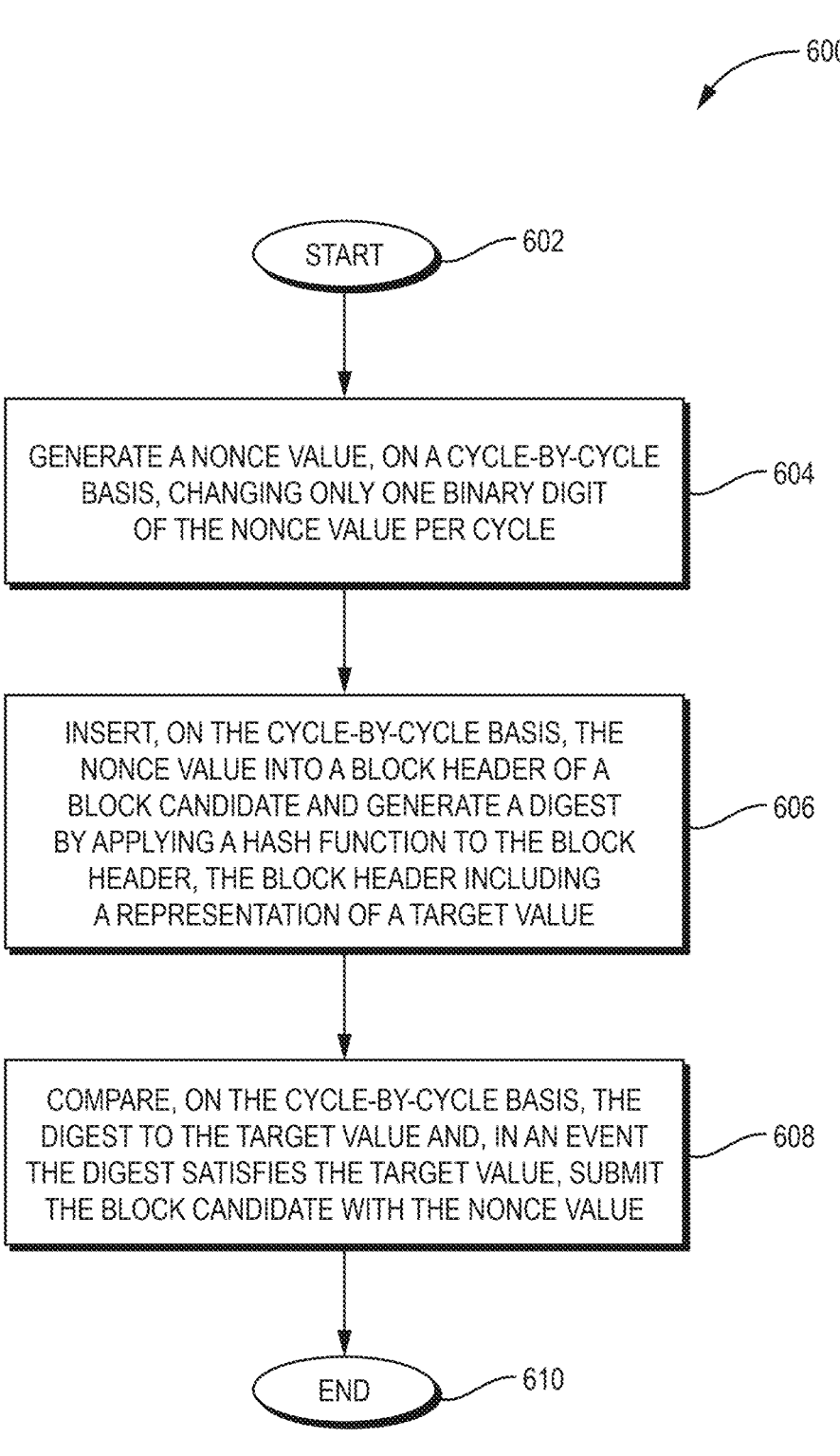
FIG. 6 is a flow diagram of an example embodiment of a method for bitcoin mining in a blockchain network.

FIG. 6 is a flow diagram 600 of an example embodiment of a method for bitcoin mining in a blockchain network. The method begins (602) and generates a nonce value, on a cycle-by-cycle basis, changing only one binary digit of the nonce value per cycle (604). The method inserts, on the cycle-by-cycle basis, the nonce value into a block header of a block candidate and generating a digest by applying a hash function to the block header (606). The block header includes a representation of a target value. The method compares, on the cycle-by-cycle basis, the digest to the target value and, in an event the digest satisfies the target value, submits the block candidate with the nonce value to the blockchain network, causing bitcoin to be mined from the blockchain network (608), and the method thereafter ends (610) in the example embodiment.

Generating the nonce value may include incrementing a gray code counter on the cycle-by-cycle basis. According to one embodiment, the nonce value may be a 32-bit gray code value output from the gray code counter. It should be understood, however, that the gray code value output from the gray code counter is not limited to 32-bits. The generating consumes less power relative to generating the nonce value via a binary counter.

Applying the hash function may include computing a first hash value by hashing the block header via the hash function and computing a second hash value by hashing the first hash value via the hash function, wherein the digest is the second hash value.

According to one embodiment, a length of the digest may be 256 bits. It should be understood, however, that the digest is not limited to 256 bits.

The method may further comprise converting the representation to the target value. In an event the digest is less than or equal to the target value, the comparing may include concluding that the digest satisfies the target value.

The method may further comprise resetting the nonce generator in the event the digest satisfies the target value.

The method may further comprise generating the block candidate and, in the event the digest satisfies the target value, changing the block candidate generated to a different block candidate for the inserting.

While example embodiments have been particularly shown and described, it will be understood by those skilled in the art that various changes in form and details may be made therein without departing from the scope of the embodiments encompassed by the appended claims.

What is claimed is:

1. A circuit comprising:
a hash engine configured to insert a gray code as a nonce value into a block header of a block candidate and generate a digest by applying a hash function to the block header, the block header including a representation of a target value; and
a validator circuit configured to compare the generated digest to the target value toward submission of the block candidate with the gray code as the nonce value to a blockchain network, the submission based on the generated digest satisfying the target value.

2. The circuit of claim 1, further comprising a gray code counter and wherein the nonce value is output from the gray code counter.

3. The circuit of claim 1, wherein the nonce value is a 32-bit gray code value.

4. The circuit of claim 1, wherein, to apply the hash function to the block header, the hash engine is further configured to:
compute a first hash value by hashing the block header via the hash function; and
compute a second hash value by hashing the first hash value via the hash function, wherein the generated digest is the second hash value.

5. The circuit of claim 1, wherein a length of the generated digest is 256 bits.

6. The circuit of claim 1, wherein, the validator circuit is further configured to convert the representation to the target value and, in an event the generated digest is less than or equal to the target value, the validator circuit is further configured to conclude that the generated digest satisfies the target value based on comparing the generated digest to the target value.

7. The circuit of claim 1, further comprising a reset controller and a gray code counter, wherein the nonce value is output from the gray code counter and wherein the reset controller is configured to reset the gray code counter responsive to the validator circuit concluding that the generated digest satisfies the target value.

8. The circuit of claim 1, wherein the circuit further comprises a block generator configured to generate the block candidate for input to the hash engine and, in the event the validator circuit concludes that the generated digest satisfies the target value, the block generator is further configured to change the block candidate generated to a different block candidate for use by the hash engine.

9. A method comprising:
inserting a gray code generated as a nonce value into a block header of a block candidate and generating a digest by applying a hash function to the block header, the block header including a representation of a target value; and
comparing the generated digest to the target value toward submission of the block candidate with the gray code as the nonce value to a blockchain network, the submission based on the generated digest satisfying the target value.

10. The method of claim 9, wherein the generating includes incrementing a gray code counter and wherein the nonce value is output from the gray code counter.

11. The method of claim 9, wherein the nonce value is a 32-bit gray code value.

12. The method of claim 9, wherein the generating consumes less power relative to generating the nonce value via a binary counter.

13. The method of claim 9, wherein applying the hash function includes:
computing a first hash value by hashing the block header via the hash function; and
computing a second hash value by hashing the first hash value via the hash function, wherein the generated digest is the second hash value.

14. The method of claim 9, wherein a length of the generated digest is 256 bits.

15. The method of claim 9, further comprising converting the representation to the target value and wherein, in an event the generated digest is less than or equal to the target value, the comparing includes concluding that the generated digest satisfies the target value.

16. The method of claim 9, further comprising outputting the nonce value from a gray code counter and resetting the gray code counter responsive to the generated digest satisfying the target value.

17. The method of claim 9, wherein the method further comprises generating the block candidate and, in the event the generated digest satisfies the target value, changing the block candidate generated to a different block candidate for the inserting.

18. An apparatus comprising:
means for inserting a gray code generated as a nonce value into a block header of a block candidate;
means for generating a digest by applying a hash function to the block header, the block header including a representation of a target value; and
means for comparing the generated digest to the target value toward submission of the block candidate with the gray code as the nonce value to a blockchain network, the submission based on the generated digest satisfying the target value.

* * * * *